(12) United States Patent
Kim et al.

(10) Patent No.: US 12,147,888 B2
(45) Date of Patent: Nov. 19, 2024

(54) NEURAL COMPUTER INCLUDING IMAGE SENSOR CAPABLE OF CONTROLLING PHOTOCURRENT

(71) Applicants: Samsung Electronics Co., Ltd., Suwon-si (KR); President and Fellows Of Harvard College, Cambridge, MA (US)

(72) Inventors: Changhyun Kim, Seoul (KR); Houk Jang, Cambridge, MA (US); Henry Julian Hinton, Cambridge, MA (US); Hyeonjin Shin, Suwon-si (KR); Minhyun Lee, Suwon-si (KR); Donhee Ham, Cambridge, MA (US)

(73) Assignees: Samsung Electronics Co., Ltd., Gyeonggi-do (KR); President and Fellows of Harvard College, Cambridge, MA (US)

( * ) Notice: Subject to any disclaimer, the term of this patent is extended or adjusted under 35 U.S.C. 154(b) by 500 days.

(21) Appl. No.: 17/500,429

(22) Filed: Oct. 13, 2021

(65) Prior Publication Data

US 2022/0147799 A1    May 12, 2022

Related U.S. Application Data

(60) Provisional application No. 63/112,720, filed on Nov. 12, 2020.

(30) Foreign Application Priority Data

Mar. 31, 2021    (KR) ........................ 10-2021-0042228

(51) Int. Cl.
*G06N 3/045*    (2023.01)
*G06F 18/214*    (2023.01)
*G06T 7/11*    (2017.01)

(52) U.S. Cl.
CPC .......... *G06N 3/045* (2023.01); *G06F 18/214* (2023.01); *G06T 7/11* (2017.01); *G06T 2207/20081* (2013.01); *G06T 2207/20084* (2013.01)

(58) Field of Classification Search
CPC ...... G06N 3/045; G06N 3/067; G06F 18/214; G06T 7/11; G06T 2207/20081; G06T 2207/20084; G06V 10/82; G06V 10/955
See application file for complete search history.

(56) References Cited

U.S. PATENT DOCUMENTS

2006/0150149 A1    7/2006    Chandhoke et al.
2007/0139541 A1    6/2007    Fein et al.
(Continued)

FOREIGN PATENT DOCUMENTS

| JP | 6725733 B2 | 7/2020 |
| KR | 2015/0056851 A | 5/2015 |
| WO | WO-2013/110803 A2 | 8/2013 |

OTHER PUBLICATIONS

Mirko Hansen et al., 'Double-Barrier Memristive Devices for Unsupervised Learning and Pattern Recognition' *Frontiers in Neuroscience*, vol. 11, Article 91, Feb. 2017.
(Continued)

*Primary Examiner* — Bobbak Safaipour
(74) *Attorney, Agent, or Firm* — HARNESS, DICKEY & PIERCE, P.L.C.

(57) ABSTRACT

Disclosed is a neural computer including an image sensor capable of controlling a photocurrent. The neural computer according to an embodiment includes a preprocessor configured to receive an image and generate a feature map for the received image; a flattening unit configured to transform the feature map generated by the preprocessor into tabular data to provide data output; and an image classifier configured to classify images received through the preprocessor by
(Continued)

using the data output by the flattening unit as an input value. The preprocessor includes an optical signal processor configured to receive the image and generate the feature map.

10 Claims, 5 Drawing Sheets

(56) References Cited

U.S. PATENT DOCUMENTS

| | | | |
|---|---|---|---|
| 2016/0358038 A1* | 12/2016 | Jaderberg | G06V 10/454 |
| 2018/0039882 A1* | 2/2018 | Ikeda | G06N 3/0675 |
| 2018/0315870 A1 | 11/2018 | Snaith et al. | |
| 2019/0034748 A1 | 1/2019 | Matsumoto et al. | |
| 2019/0277957 A1* | 9/2019 | Chandrasekhar | G01S 5/017 |
| 2020/0090028 A1* | 3/2020 | Huang | G06V 30/19173 |
| 2020/0320677 A1 | 10/2020 | Ion et al. | |
| 2021/0036024 A1* | 2/2021 | Kim | H10B 51/30 |
| 2021/0151678 A1 | 5/2021 | Lee et al. | |
| 2021/0152732 A1 | 5/2021 | Eki | |
| 2021/0224643 A1* | 7/2021 | Li | G06N 3/045 |
| 2021/0256311 A1* | 8/2021 | Olarig | G06F 18/2148 |
| 2022/0284552 A1* | 9/2022 | Yang | G06T 5/80 |
| 2022/0292332 A1* | 9/2022 | Koumura | G06N 3/063 |
| 2023/0109524 A1* | 4/2023 | Hirose | H04N 25/77 348/300 |
| 2023/0298145 A1* | 9/2023 | Miscuglio | G06N 3/08 382/279 |
| 2023/0377094 A1* | 11/2023 | Horii | G06N 3/04 |

OTHER PUBLICATIONS

Seunghwan Seo et al., 'Artificial optic-neural synapse for colored and color-mixed pattern recognition' *Nature Communications*, 9:5106, 2018.

Houk Jang et al., 'An Atomically Thin Optoelectronic Machine Vision Processor' *Advanced Materials*, vol. 32, 2020.

'ML Practicum: Image Classification' Machine Learning, Google Developers, Jul. 2022 https://developers.google.com/machine-learning/practica/image-classification/convolutional-neural-networks.

* cited by examiner

NEURAL COMPUTER INCLUDING IMAGE SENSOR CAPABLE OF CONTROLLING PHOTOCURRENT

CROSS-REFERENCE TO RELATED APPLICATIONS

This application claims the benefit of U.S. Provisional Application No. 63/112,720, filed on Nov. 12, 2020, in the US Patent Office and Korean Patent Application No. 10-2021-0042228, filed on Mar. 31, 2021, in the Korean Intellectual Property Office, the disclosures of which are incorporated herein in their entireties by reference.

BACKGROUND

1. Field

The present disclosure relates to computers, and more particularly, to neural computers including an image sensor capable of controlling a photocurrent.

2. Description of the Related Art

An artificial neural network algorithm that imitates the structure of a human optic nerve may be used in deep learning. This neural network algorithm may be used in neural network computing. So far, various neural network algorithms have been introduced, and representative products are, for example, a convolution neural network (CNN), a recurrent neural network (RNN), etc. In the case of the CNN, a feature map is extracted from multiple convolutional layers, and only an important part of the feature map is taken by reducing dimensions through subsampling. CNN is an essential technology used in most computer vision fields, such as image classification, semantic segmentation, optical flow, etc., and compared to multi-layer perceptron (MLP) which is an early algorithm, it has less computational load and higher performance.

SUMMARY

Provided are neural computers capable of simplifying an operation of processing an input image.

Provided are neural computers capable of reducing a processing capacity of input image and time.

Provided are neural computers capable of improving the degree of integration and constructing a large area device.

Additional aspects will be set forth in part in the description which follows and, in part, will be apparent from the description, or may be learned by practice of the presented embodiments of the disclosure.

According to an embodiment, a neural computer includes a preprocessor configured to receive an image and generate a feature map of the received image, a flattening unit configured to transform the feature map generated by the preprocessor into tabular data to provide data output, and an image classifier configured to classify images received through the preprocessor by using the data output by the flattening unit as an input value. The preprocessor includes an optical signal processor configured to receive the image and generate the feature map.

In one example, the optical signal processor may include an image sensor configured to receive the image and generate the feature map, and a controller connected to the image sensor and configured to control a voltage for generating the feature map.

In one example, the image sensor may include a plurality of pixels, wherein each of the plurality of pixels may include a substrate, an insulating layer on the substrate, first and second gate electrodes separated from each other on the insulating layer, and source and drain electrodes separated from each other on the substrate with the insulating layer therebetween. A voltage of the first and second gate electrodes may be controlled by the controller.

In one example, the substrate may include Si, Ge, or a compound including Si and Ge.

In one example, the substrate may include graphene, a transition metal dichalcogenide (TMD), or black phosphorus (BP).

In one example, the TMD may include any one of Mo, W, Ti, Ni, Ta, Hf and Zr and the TMD may include one of S, Se and Te.

In one example, the insulating layer may include an oxide of any one of Si, Al, Hf, Zr, Ti, Ta, and W.

In an example, the insulating layer may include a perovskite material having the structure of $ABO_3$. "A," in $ABO_3$, may be any one of Li, Na, K, Ca, Rb, Sr, Y, Ag, Cs, Ba, La, Ce, Pr, Nd, Sm, Gd, Dy, Ho, Yb and Bi. "B," in $ABO_3$, may be any one of Mg, Al, Sc, Ti, V, Cr, Mn, Fe, Co, Ni, Cu, Zn, Ga, Ge, Y, Zr, Nb, Mo, Ru, Pd, Cd, In, Sn, Sb, La, Ce, Pr, Nd, Sm, Gd, Ta, W, Ir, Pb, and Bi.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
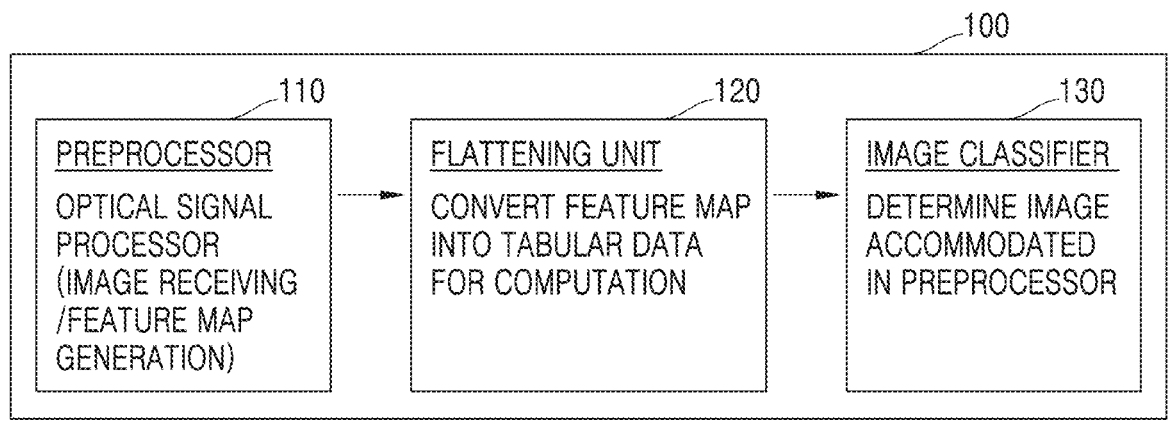
FIG. 1 is a block diagram showing a configuration of a neural computer according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a neural computer including an image sensor capable of controlling a photocurrent according to an embodiment will be described in detail with reference to the accompanying drawings. In the drawings, thicknesses of layers and regions may be exaggerated for clarification of the specification. The embodiments of the inventive concept are capable of various modifications and may be embodied in many different forms. When an element or layer is referred to as being "on" or "above" another element or layer, the element or layer may be directly on another element or layer or intervening elements or layers. In the drawings, like reference numerals refer to like elements throughout.

FIG. 1 is a block diagram showing a configuration of a neural computer 100 according to an embodiment.

Referring to FIG. 1, the neural computer 100 according to an embodiment includes a preprocessor 110, a flattening unit 120, and an image classifier 130. The preprocessor 110 may include an optical signal processor. The optical signal processor of the preprocessor 110 may be configured to perform a process of receiving an image and a process of generating a feature map by processing the received image. The process of receiving the image may include a process of capturing an external image, for example, numbers, letters, figures, photos, etc., or a process of receiving the external image as it is. The feature map may be data corresponding to the received image, and may be a set of numbers in a two-dimensional form. A final feature map generated by the optical signal processor may be an input value of the image classifier 130 through the flattening unit 120. That is, in the flattening unit 120, the final feature map (image data of a two-dimensional form) is transformed into tabular data for calculation. The transformed data (also referred to as data output) may be used as an input value input to the image classifier 130. In one example, the image classifier 130 may include a fully connected layer of a CNN. Accordingly, the image classifier 130 may classify an image received through the preprocessor 110. That is, the image classifier 130 may determine that what kind of image is the image captured through the optical signal processor of the preprocessor 110.

Figure 2:
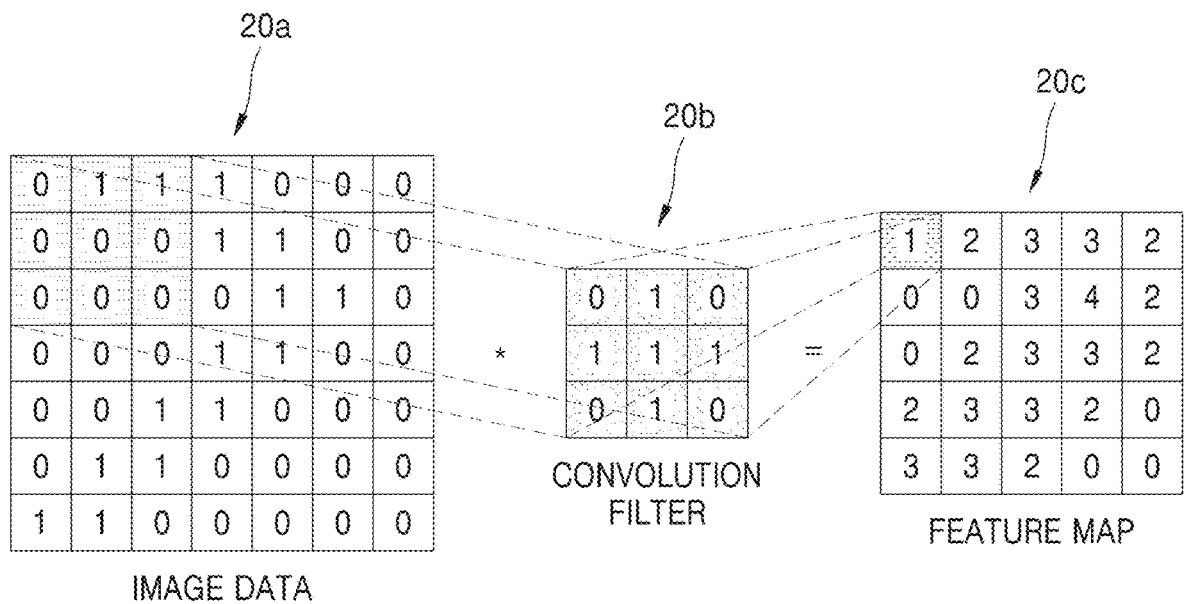
FIG. 2 is a block diagram illustrating an example of a process of generating a feature map performed by an image sensor of the neural computer of FIG. 1.
Figure 3:
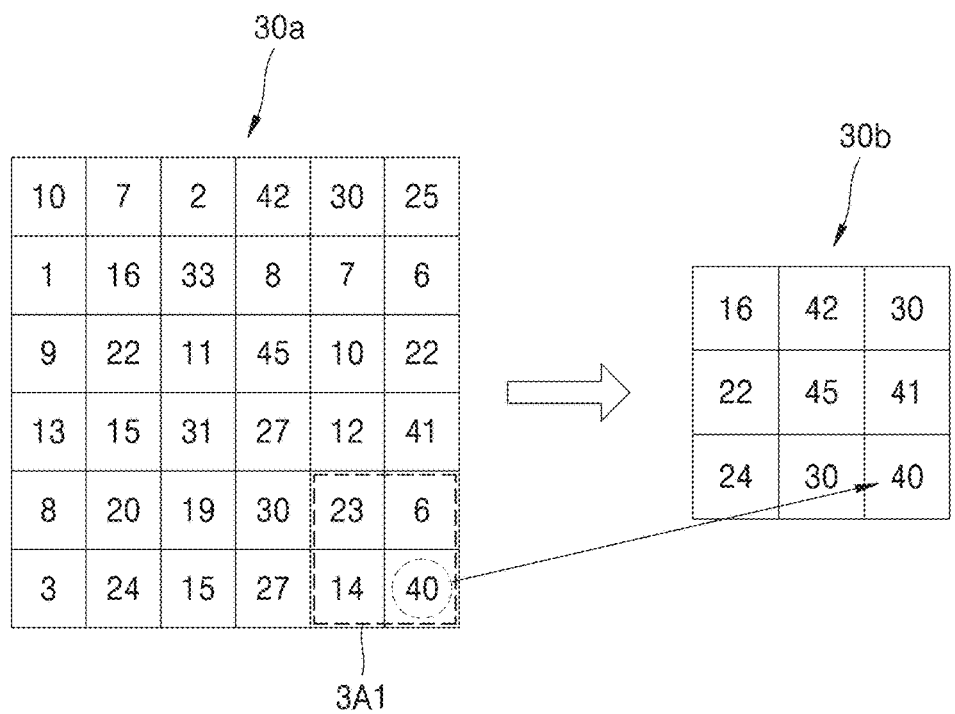
FIG. 3 is a block diagram illustrating an example of a process of pooling a feature map performed by an image sensor of the neural computer of FIG. 1.

The process of generating a feature map may include a process of generating a first feature map with respect to the received image and a process of generating a second feature map with respect to the first feature map. The second feature map may be a compression of the first feature map. In one example, the process of generating the feature map may include only the process of generating the first feature map. In one example, the process of generating the feature map may further include processes of generating a third feature map, a fourth feature map and so on in addition to the process of generating the second feature map. In an example, the process of generating the first feature map may include a process of applying a first convolution filter to the received image. The first convolution filter may be generated in consideration of the characteristics (type) of the received image. The first feature map may be obtained by applying the first convolution filter to the received image data. In an example, the process of generating the second feature map may include the process of applying a second convolution filter to the first feature map, and what is obtained by applying the second convolution filter to the first feature map may be the second feature map. In one example, the process of generating the second feature map may include a process of first pooling the first feature map, and what is obtained as a result of the first pooling may be the second feature map. A feature map finally generated by the preprocessor 110 is formed through the process of applying the convolutional filter and/or pooling. FIG. 2 shows an example of a process of generating a feature map. In FIG. 2, 20a represents data representing an image captured by the preprocessor 110, 20b represents a convolution filter, and 20c represents a feature map obtained by applying the convolution filter of 20b to the received image of 20a. FIG. 3 shows an example of a process of pooling a feature map. Assuming that 30a of FIG. 3 represents the first feature map, the feature map of 30b is a feature map obtained by max-pooling the data of 30a, and may represent the second feature map. The max-pooling is to select the largest number in a 2*2 region 3A1 of the feature map of 30a, and the feature map shown in 30b may be obtained by performing max pooling with respect to the entire region of the feature map of 30a.

The process of generating the convolutional filter and the pooling process may be performed by using the optical signal processor. In one example, the optical signal processor may include an image sensor.

Figure 4:
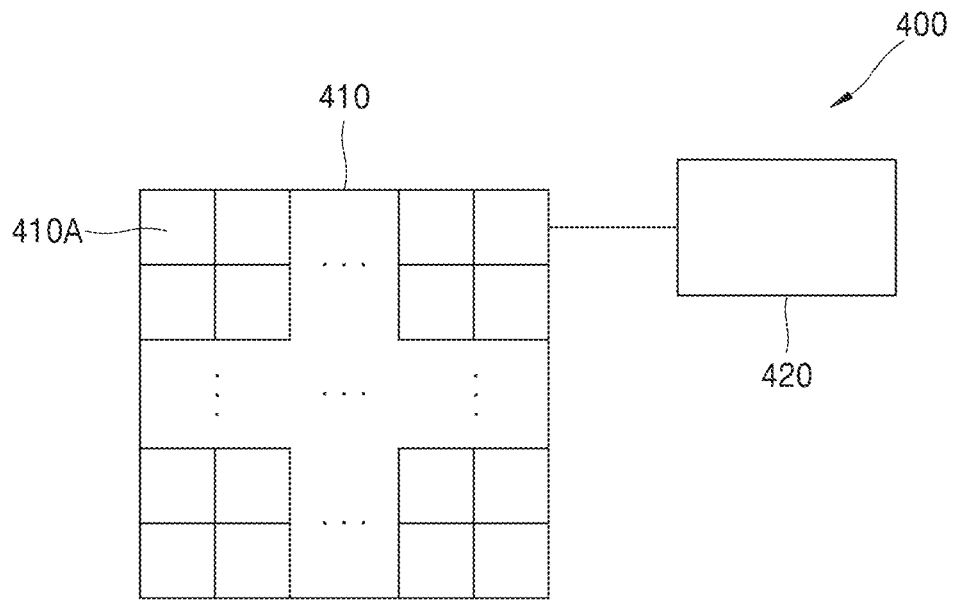
FIG. 4 is a block diagram of an optical signal processing device according to an embodiment.

FIG. 4 shows an example of the optical signal processor 400.

Referring to FIG. 4, the optical signal processor 400 according to an embodiment may include an image sensor 410 and a controller 420 connected to the image sensor 410. The controller 420 may be electrically connected to the image sensor 410. The controller 420 may be a voltage regulator or may include a voltage regulator.

The image sensor 410 may include a plurality of pixels 410A aligned to accommodate a given image. The controller 420 may be electrically connected to each of the plurality of pixels 410A. In an example, the connection between the controller 420 and the pixel 410A may denote the connection between the controller 420 and a device, for example, an optical device, that is disposed in the pixel 410A to perform a pixel role. The connection between the controller 420 and the image sensor 410 is designed so that the controller 420 selects an arbitrary pixel from among the plurality of pixels 410A of the image sensor 410 and controls a voltage applied to the selected pixel. In one example, an independent controller may be connected to each of the plurality of pixels 410A, and the independent controller may be controlled by a main controller.

Figure 5:
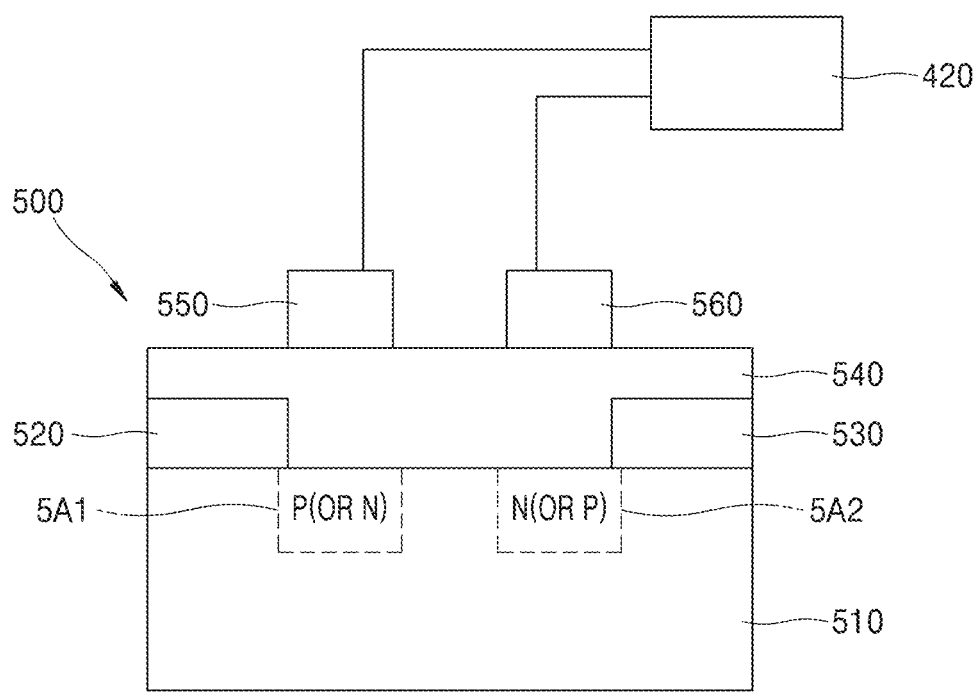
FIG. 5 is a cross-sectional view illustrating an example of an optical device that is disposed in a unit pixel of FIG. 4 to capture an image.

FIG. 5 shows an example of an optical device 500 that is arranged on the unit pixel 410A of FIG. 4 to capture an image. In one example, the optical device 500 may be a light-receiving device that causes photoelectric conversion.

Referring to FIG. 5, the optical device 500 may include a substrate 510, an insulating layer 540, a source electrode 520, a drain electrode 530, a first gate electrode 550, and a second gate electrode 560. In one example, the substrate 510 may be a semiconductor substrate including silicon (Si), germanium (Ge), or a compound including these materials. In one example, the substrate 510 may include graphene, transition metal dichalcogenide (TMD), or black phosphorus (BP). In one example, TMD may include any one of Mo, W, Ti, Ni, Ta, Hf, and Zr and one of S, Se, and Te, but is not limited thereto. In one example, the insulating layer 540 may be a dielectric layer or may include a dielectric layer. In one example, the dielectric layer may include an oxide or nitride of any one of Si, Al, Hf, Zr, Ti, Ta, and W. In one example, the dielectric layer may include a perovskite material having an ABO$_3$ structure. In one example, "A" in ABO$_3$ may be any one of Li, Na, K, Ca, Rb, Sr, Y, Ag, Cs, Ba, La, Ce, Pr, Nd, Sm, Gd, Dy, Ho, Yb and Bi. "B" in ABO$_3$ may be any one of Mg, Al, Sc, Ti, V, Cr, Mn, Fe, Co, Ni, Cu, Zn, Ga, Ge, Y, Zr, Nb, Mo, Ru, Pd, Cd, In, Sn, Sb, La, Ce, Pr, Nd, Sm, Gd, Ta, W, Ir, Pb and Bi. The substrate 510, the insulating layer 540, and the first and second gate electrodes 550 and 560 are sequentially stacked in the order described. The source electrode 520 and the drain electrode 530 are arranged on a first surface (e.g., an upper surface) of the substrate 510. The source and drain electrodes 520 and 530 are in direct contact with the first surface of the substrate 510. The source and drain electrodes 520 and 530 are separated from each other. The insulating layer 540 is formed on the first surface of the substrate 510 between the source electrode 520 and the drain electrode 530, is in direct contact with the first surface, and covers the entire first surface. The insulating layer 540 directly contacts the source and drain electrodes 520 and 530 and covers the upper surface thereof. As a result, the source and drain electrodes 520 and 530 are arranged between the insulating layer 540 and the substrate 510. An upper surface of the insulating layer 540 may be flat. The first and second gate electrodes 550 and 560 are provided on the upper surface of the insulating layer 540 and are separated from each other. A first region 5A1 and a second region 5A2 are present in an upper part of the substrate 510. The first and second regions 5A1 and 5A2 are separated from each other but may be virtual regions that do not have a physical boundary. Accordingly, the first and second regions 5A1 and 5A2 are indicated by dash lines. The first region 5A1 and the second region 5A2 may be positioned between the source and drain electrodes 520 and 530. A part of the first region 5A1 may extend below the source electrode 520. A part of the second region 5A2 may extend below the drain electrode 530. The first gate electrode 550 may be arranged at a position facing the first region 5A1 with the insulating layer 540 therebetween. The second gate electrode 560 may be arranged at a position facing the second region 5A2 with the insulating layer 540 therebetween. The first and second gate electrodes 550 and 560 may be connected to the controller 420. A voltage applied to the first and second gate electrodes 550 and 560 may be controlled by the controller 420. The first region 5A1 may be a P-type or N-type region according to electrostatic doping using the first gate electrode 550. The second region 5A2 may be P-type or N-type according to electrostatic doping using the second gate electrode 560. In this way, a PN photodiode or an NP photodiode may be formed in the substrate 510. The P-type region may be equivalent to a region doped with a P-type dopant, and the N-type region may be equivalent to a region doped with an N-type dopant. The P-type or N-type characteristics of the first region 5A1 may be controlled according to a voltage applied to the first gate electrode 550. In other words, the controlling of a voltage applied to the first gate electrode 550 may have the same effect as controlling the P-type doping concentration or the N-type doping concentration of the first region 5A1. The P-type or N-type characteristics of the second region 5A2 may also be controlled according to a voltage applied to the second gate electrode 560. In other words, the controlling of a voltage applied to the second gate electrode 560 may have the same effect as controlling the P-type doping concentration or the N-type doping concentration of the second region 5A2. As a result, the type of photodiode formed in the substrate 510 may be determined according to a voltage applied to the first and second gate electrodes 550 and 560, and a photocurrent of the determined photodiode may also be controlled. Because the optical device 500 is included in each pixel 410A of the image sensor 410 of FIG. 4, a photocurrent of each pixel 410A in the image sensor 410 may be independently controlled by controlling a voltage applied to the first and second gate electrodes 550 and 560. In this way, because the photocurrent of each pixel 410A of the image sensor 410 is independently controlled, a desired response may be obtained from each pixel 410A. For example, in a process of receiving an image, that is, in a process of capturing an image, by controlling the direction of the photocurrent of each pixel 410A and the amount of photocurrent, etc., the image sensor 410 may act as a convolution filter including 1, 0 or −1. Here, "1" and "0" may indicate the presence or absence of a photocurrent, and "1" and "−1" may be classified according to the direction of the photocurrent. In this way, because the image sensor 410 acts as a convolutional filter, a feature map with respect to a received image may be generated while receiving an image by using the image sensor 410. In other words, optical signal processing (image capture) and electrical signal processing (feature map generation) may be simultaneously performed by using the image sensor 410.

In the case of a conventional neural computer that captures an image, stores the captured image and generates a feature map by applying a convolutional filter to the stored image, the processes of storing the captured image and generating the feature map with respect to the stored image are performed in another unit outside the image sensor. On the other hand, in the case of a neural computer according to an embodiment, as described above, the process from capturing an image to generating a feature map is performed in an image sensor, and thus, the operation of the neural computer may be simplified, and a separate unit for storing a captured image and generating a feature map with respect to the stored image is not required, and thus, the volume of the computer may be reduced and the degree of integration may be increased.

The optical signal processor 400 including the image sensor 410 in which the optical device 500 is provided in each pixel 410A may be applied to other devices, for example, a CMOS image sensor, machine vision, neuromorphic, analog computing, etc.

Figure 6:
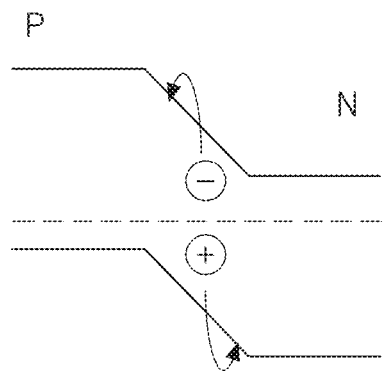
FIG. 6 is a graph showing an energy band when a first region of the optical device of FIG. 5 is a P-type and a second region of the optical device of FIG. 5 is an N-type.
Figure 7:
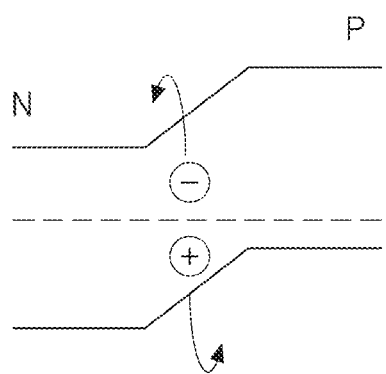
FIG. 7 is a graph showing an energy band when a first region of the optical device of FIG. 5 is an N-type and a second region of the optical device of FIG. 5 is a P-type.

FIG. 6 shows an energy band when the first region 5A1 of the optical device 500 of FIG. 5 is a P-type by electrostatic doping and the second region 5A2 is an N-type by electrostatic doping. FIG. 7 shows an energy band when the first region 5A1 of the optical device 500 of FIG. 5 is an N-type by electrostatic doping and the second region 5A2 is a P-type by electrostatic doping.

Figure 8:
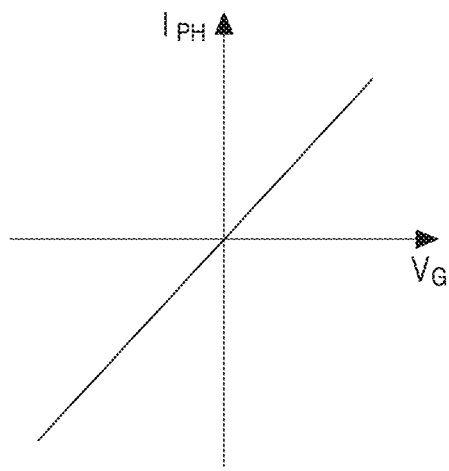
FIG. 8 is a graph showing a relationship between a photocurrent ($I_{PH}$) and a gate voltage ($V_G$) of the optical device of FIG. 5.

FIG. 8 shows a relationship between a photocurrent I$_{PH}$ and a gate voltage V$_G$ of the optical device 500 of FIG. 5.

Referring to FIG. 8, the gate voltage V$_G$ and the photocurrent I$_{PH}$ have proportionality in both positive voltage and negative voltage regions. That is, as the positive and negative voltages of the gate increase, the photocurrent also increases.

Figure 9:
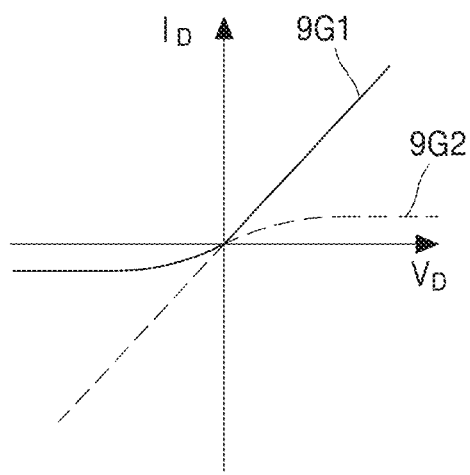
FIG. 9 is a graph showing a rectification characteristic (drain current ($I_D$)-drain voltage ($V_D$) relationship) of the optical device of FIG. 5.

FIG. 9 shows rectification characteristics of the optical device 500 of FIG. 5, that is, a relationship between drain current I$_D$ and drain voltage V$_D$. In FIG. 9, a first graph 9G1 shows rectification characteristics when the first and second regions 5A1 and 5A2 of the optical device 500 are P-type and N-type, respectively, and the second graph 9G2 shows a rectification characteristic when the first and second regions 5A1 and 5A2 of the optical device 500 are N-type and P-type, respectively.

Referring to FIG. 9, it may be seen that when the first and second regions 5A1 and 5A2 are P-type and N-type, respectively (9G1), a drain current increases with a drain voltage at the positive drain voltage $V_D$, and the drain current is small and constant at the negative drain voltage $V_D$. On the other hand, it may be seen that when the first and second regions 5A1 and 5A2 are N-type and P-type, respectively (9G2), a drain current increases with a drain voltage at the negative drain voltage $V_D$, and the drain current is small and constant at the positive drain voltage $V_D$.

From the results of FIG. 9, it may be seen that the directions of a photocurrent flowing through the optical device 500 are opposite according to the electrostatic doping characteristics of the first and second regions 5A1 and 5A2 of the optical device 500 of FIG. 5.

The disclosed neural computer includes an image sensor capable of controlling a voltage applied to a gate electrode of an optical device provided in a pixel. In such an image sensor, a process from receiving an image (e.g., capturing an image) to generating a feature map may be performed. Therefore, in the case of using the neural computer according to an embodiment, the process from receiving an image to classifying (recognizing) an image may be simplified, the computer volume may be reduced, and the degree of integration may be increased.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A neural computer comprising:
a preprocessor configured to receive an image and generate a feature map of the received image;
a flattening unit configured to transform the feature map generated by the preprocessor into tabular data to provide data output; and
an image classifier configured to classify images received through the preprocessor by using the data output by the flattening unit as an input value,
wherein the preprocessor includes an optical signal processor configured to receive the image and generate the feature map,
wherein the optical signal processor includes an image sensor with a plurality of pixels,
wherein each of the plurality of pixels includes an optical device configured to cause photoelectric conversion such that the plurality of pixels include a plurality of optical devices, and
wherein the optical signal processor is configured to independently control a photocurrent in each of the plurality of pixels by independently controlling a voltage applied to a pair of electrodes in each corresponding one of the plurality of optical devices.

2. A neural computer comprising:
a preprocessor configured to receive an image and generate a feature map of the received image;
a flattening unit configured to transform the feature map generated by the preprocessor into tabular data to provide data output; and
an image classifier configured to classify images received through the preprocessor by using the data output by the flattening unit as an input value,
wherein the preprocessor includes an optical signal processor configured to receive the image and generate the feature map,
wherein the optical signal processor comprises an image sensor and a controller connected to the image sensor, the image sensor is configured to receive the image and generate the feature map, and the controller is configured to control a voltage for generating the feature map, and
the preprocessor is configured to simultaneously perform optical signal processing for receiving the image and electrical signal processing for generating the feature map of the received image using the image sensor and the controller.

3. A neural computer comprising:
a preprocessor configured to receive an image and generate a feature map of the received image;
a flattening unit configured to transform the feature map generated by the preprocessor into tabular data to provide data output; and
an image classifier configured to classify images received through the preprocessor by using the data output by the flattening unit as an input value,
wherein the preprocessor includes an optical signal processor configured to receive the image and generate the feature map,
wherein the optical signal processor comprises an image sensor and a controller connected to the image sensor, the image sensor is configured to receive the image and generate the feature map, and the controller is configured to control a voltage for generating the feature map,
wherein the image sensor comprises a plurality of pixels,
wherein each of the plurality of pixels comprises a substrate, an insulating layer on the substrate, first and second gate electrodes separated from each other on the insulating layer, and source and drain electrodes separated from each other on the substrate with the insulating layer therebetween, and
wherein the controller is configured to control a voltage of the first and second gate electrodes.

4. The neural computer of claim 3,
wherein the substrate includes Si, Ge or a compound including Si and Ge.

5. The neural computer of claim 3,
wherein the substrate includes graphene, transition metal dichalcogenide (TMD), or black phosphorus (BP).

6. The neural computer of claim 5,
wherein TMD includes any one of Mo, W, Ti, Ni, Ta, Hf and Zr, and
the TMD includes one of S, Se and Te.

7. The neural computer of claim 3,
wherein the insulating layer includes an oxide of any one of Si, Al, Hf, Zr, Ti, Ta, and W.

8. The neural computer of claim 3,
wherein the insulating layer includes a nitride of any one of Si, Al, Hf, Zr, Ti, Ta, and W.

9. The neural computer of claim 3,
wherein the insulating layer includes a perovskite material having a structure of $ABO_3$,
"A" in $ABO_3$ is any one of Li, Na, K, Ca, Rb, Sr, Y, Ag, Cs, Ba, La, Ce, Pr, Nd, Sm, Gd, Dy, Ho, Yb and Bi,
"B" in in $ABO_3$ is any one of Mg, Al, Sc, Ti, V, Cr, Mn, Fe, Co, Ni, Cu, Zn, Ga, Ge, Y, Zr, Nb, Mo, Ru, Pd, Cd, In, Sn, Sb, La, Ce, Pr, Nd, Sm, Gd, Ta, W, Ir, Pb, and Bi.

10. The neural computer of claim 2, wherein
wherein the image sensor comprises a plurality of pixels,
wherein each of the plurality of pixels includes an optical device configured to cause photoelectric conversion such that the plurality of pixels include a plurality of optical devices, and
wherein the controller is configured to operate the image sensor as a convolution filter by independently controlling a photocurrent in each of the plurality of pixels based on independently controlling a voltage applied to a pair of electrodes in each corresponding one of the plurality of optical devices.

* * * * *